United States Patent
Ansari et al.

(10) Patent No.: US 12,431,534 B2
(45) Date of Patent: Sep. 30, 2025

(54) SOLID-STATE POLYMER ELECTROLYTE FOR USE IN PRODUCTION OF ALL-SOLID-STATE ALKALI-ION BATTERIES

(71) Applicant: Enevate Corporation, Irvine, CA (US)

(72) Inventors: Younes Ansari, Irvine, CA (US); Benjamin Park, Mission Viejo, CA (US); Liwen Ji, Irvine, CA (US); Jill Renee Pestana, Long Beach, CA (US)

(73) Assignee: ENEVATE CORPORATION, Irvine, CA (US)

( * ) Notice: Subject to any disclaimer, the term of this patent is extended or adjusted under 35 U.S.C. 154(b) by 290 days.

(21) Appl. No.: 16/739,732

(22) Filed: Jan. 10, 2020

(65) Prior Publication Data
US 2021/0194055 A1    Jun. 24, 2021

Related U.S. Application Data

(60) Provisional application No. 62/952,189, filed on Dec. 20, 2019.

(51) Int. Cl.
*H01M 4/38*    (2006.01)
*C08L 71/02*    (2006.01)
(Continued)

(52) U.S. Cl.
CPC ......... *H01M 10/0565* (2013.01); *C08L 71/02* (2013.01); *H01M 4/386* (2013.01); *H01M 10/0525* (2013.01); *C08L 2203/20* (2013.01); *C08L 2205/02* (2013.01); *H01M 2004/027* (2013.01); *H01M 2300/0082* (2013.01); *H01M 2300/0091* (2013.01)

(58) Field of Classification Search
CPC ............ H01M 10/0565; H01M 4/386; H01M 10/0525; H01M 2004/027; H01M 2300/0082; H01M 2300/0091; H01M 10/056; H01M 50/414; H01M 50/437; C08L 71/02; C08L 2203/20; C08L 2205/02; Y02E 60/10; Y02P 70/50
USPC .......................................................... 429/309
See application file for complete search history.

(56) References Cited

U.S. PATENT DOCUMENTS

| | | | |
|---|---|---|---|
| 4,970,012 A | * | 11/1990 | Kuroda ................ H01M 6/181 429/317 |
| 5,962,169 A | | 10/1999 | Angell et al. |

(Continued)

FOREIGN PATENT DOCUMENTS

| | | | |
|---|---|---|---|
| CN | 109004280 | * | 12/2018 |
| CN | 109004280 A | | 12/2018 |

(Continued)

OTHER PUBLICATIONS

Yu et al., Fabrication and Characterization of PEO/PPC Polymer Electrolyte for Lithium-Ion Battery, Journal of Applied Polymer Science, vol. 115, 2718-2722, 2008 (Year: 2008).*

(Continued)

*Primary Examiner* — Christian Roldan
(74) *Attorney, Agent, or Firm* — McAndrews, Held & Malloy, Ltd.

(57) ABSTRACT

Systems and methods are provided for synthesizing solid-state polymer electrolyte and/or using solid-state polymer electrolyte in production of all-solid-state alkali-ion batteries.

26 Claims, 11 Drawing Sheets

(51) Int. Cl.
   *H01M 4/02* (2006.01)
   *H01M 10/0525* (2010.01)
   *H01M 10/0565* (2010.01)

(56) References Cited

U.S. PATENT DOCUMENTS

| | | | | |
|---|---|---|---|---|
| 6,475,663 | B1* | 11/2002 | Mohwald | H01M 4/621 |
| | | | | 429/129 |
| 2009/0042099 | A1* | 2/2009 | Tatematsu | H01M 10/0562 |
| | | | | 429/233 |
| 2010/0092870 | A1* | 4/2010 | Shembel | H01M 10/0565 |
| | | | | 429/312 |
| 2011/0045351 | A1* | 2/2011 | Peled | H01M 4/485 |
| | | | | 205/261 |
| 2012/0094189 | A1* | 4/2012 | Scrosati | H01M 4/581 |
| | | | | 429/314 |
| 2015/0188187 | A1* | 7/2015 | Strand | H01M 10/056 |
| | | | | 429/317 |
| 2016/0276109 | A1* | 9/2016 | Krishnan | H01M 10/0565 |
| 2017/0170515 | A1 | 6/2017 | Yushin et al. | |
| 2017/0214083 | A1* | 7/2017 | Darolles | H01M 4/386 |
| 2017/0263975 | A1* | 9/2017 | Anandan | H01M 4/13 |
| 2018/0151887 | A1* | 5/2018 | Yang | H01M 50/411 |
| 2018/0166700 | A1 | 6/2018 | Tamirisa et al. | |
| 2019/0181491 | A1* | 6/2019 | Park | H01M 10/446 |
| 2020/0014033 | A1* | 1/2020 | Yakovleva | H01M 10/0525 |
| 2020/0220220 | A1* | 7/2020 | Martin | H01M 10/052 |

FOREIGN PATENT DOCUMENTS

| | | | |
|---|---|---|---|
| CN | 109802174 A | * | 5/2019 |
| KR | 20190079131 A | * | 7/2019 |

OTHER PUBLICATIONS

Yang et al., "Flexible Composite Solid Electrolyte Facilitating Highly Stable "Soft Contacting" Li-Electrolyte Interface for Solid State Lithium-Ion Batteries", Advance Energy Materials, 2017 [retrieved on Jan. 20, 2021]. Retrieved from the Internet: <URL:https://www.pkusz.edu.cn/uploadfile/2017/0913/20170913101429795.pdf>, pp. 1-9.

International Search Report and Written Opinion for PCT/US2020/063464, mailed Mar. 8, 2021, 9 pages.

International Preliminary Report on Patentability, PCT/US2020/063464 dated May 17, 2022, 8 pages.

\* cited by examiner

SOLID-STATE POLYMER ELECTROLYTE FOR USE IN PRODUCTION OF ALL-SOLID-STATE ALKALI-ION BATTERIES

CLAIM OF PRIORITY

This patent application makes reference to, claims priority to and claims benefit from U.S. Provisional Patent Application Ser. No. 62/952,189, filed on Dec. 20, 2019. The above identified application is hereby incorporated herein by reference in its entirety.

TECHNICAL FIELD

Aspects of the present disclosure relate to energy generation and storage. More specifically, certain implementations of the present disclosure relate to methods and systems for synthesizing solid-state polymer electrolyte for use in production of all-solid-state alkali-ion batteries.

BACKGROUND

Various issues may exist with conventional battery technologies. In this regard, conventional systems and methods, if any existed, for designing and making battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for synthesizing solid-state polymer electrolyte for use in production of all-solid-state alkali-ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
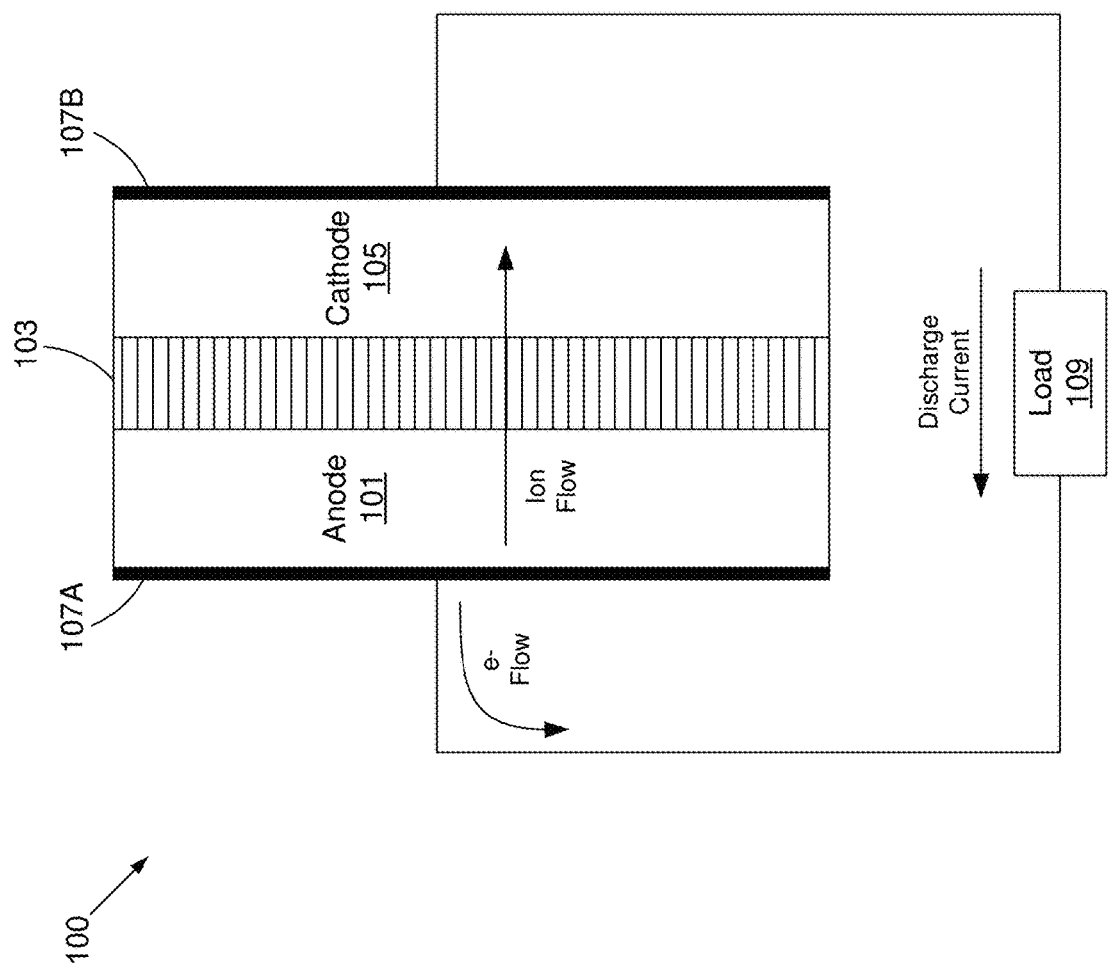
FIG. 1 is a diagram of a battery with silicon-dominant anode, in accordance with an example embodiment of the disclosure.

FIG. 1 is a diagram of a battery with silicon-dominant anode, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), di-fluoroethylene carbonate (DiFEC), trifluoropropylene carbonate (TFPC), vinyl carbonate (VC), Propylene Carbonate (PC), Dimethyl Carbonate (DMC), Ethyl Methyl Carbonate (EMC), Diethyl Carbonate (DEC), etc. with dissolved lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl) imide (LiTFSI), lithium bis(fluorosulfonyl)imide (LiFSI), lithium difluoro(oxalate)borate (LiDFOB), lithium bis(oxalato)borate (LiBOB), and lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), etc.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g at high temperature and 3579 mAh/g at room temperature. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally nonflammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super-P), vapor grown carbon fibers (VGCF), graphite, graphene, etc., and/or a mixture of these have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In various implementations in accordance with the present disclosure, solid-state electrolytes that are optimized for use in alkali-ion (e.g., lithium-ion) batteries and for enhancing performance of such batteries, may be used. In this regard, with the constant push for electrification, the need for energy-dense yet safe batteries, for energy storage and power, is constantly increasing. Pushing the limits of energy density in lithium-ion batteries may be impeded by performance limitations and/or may lead to safety issues. Current alkali-ion batteries (e.g., lithium-ion batteries) may contain liquid electrolytes (e.g., organic liquid electrolytes). Use of such liquid electrolyte may have some disadvantageous, however. For example, many of the safety issues may arise from use of organic liquid electrolyte in lithium-ion batteries. In this regard, liquid electrolytes may pose safety hazards, such as due to volatilization, flammability, and leakage. Further, during battery use, some metal oxide electrodes, such as a high-Nickel NCA or NCM cathodes may, may degrade due to chemical reactions with the liquid electrolyte, which may cause dissolution, migration, and incorporation processes involving the transition metal ions on the cathode, which may ultimately lead to cell failure. Because of such hazards, along with the need to improve the energy density of the battery, use of safer or more optimized substitutes for organic liquid electrolytes in batteries may be desirable.

Many of the safety risks and/or performance limitations may be remedied by substituting the organic liquid electrolytes typically used in the cells with an alternative that is safer and may offer improved performance, such as solid-state electrolytes. In this regard, solid-state electrolytes may be nonflammable and nonvolatile, and as such may be safer than their liquid counterparts, while also increasing the energy density of batteries. An additional benefit of using such solid-state electrolytes is that their decreased reactivity with the cathode may help prevent degradation of the cathode. However, not all solid-state electrolytes may be suitable for use. For example, use of inorganic solid-solid electrolytes may have some disadvantages, as these electrolytes may suffer from issues including poor mechanical properties and low elastic moduli. However, organic (e.g., polymer) based solid-state electrolytes may be a better substitute, such as due to their higher flexibility, improved conductivity, and better contact or adhesion with electrode active materials.

Nonetheless, despite the benefits of solid-state batteries, use of such batteries may be impeded by many issues and/or challenges. For instance, fabrication of solid-state batteries may require prolonged processes, which may include, e.g., mixing solid components at various stages of fabrication in order to achieve homogenous electrodes and separators to provide an acceptable capacity and energy density. Further, even with such time-consuming fabrication processes, due to the solid nature of the materials, the resulting battery components (anode, cathode, the electrolyte/ionically-conductive separator) may suffer from lack of homogeneity and contact between all components. As a result, solid-state batteries may underperform when compared with typical liquid electrolyte based batteries. Accordingly, challenges such as the low electrolyte conductivity, fabrication cost, in combination with poor performance may limit the production of solid-state batteries commercially.

Implementations in accordance with the present disclose overcome and remedy many of the challenges and issues that may impede use of solid-state battery. In particular, in various example implementations challenges of solid-state battery fabrication may be addressed by providing a solid-state electrolyte with an adjusted melting point (e.g., <100° C.), high mechanical strength, and high conductivity. These combined properties may facilitate the fabrication of solid-state batteries with the capability of performing at room-temperature. For example, the adjusted melting point of solid-state (e.g., polymer) electrolyte in accordance with the present disclosure may allow for production of all-solid-state batteries that are otherwise not processable, such as silicon-anode batteries, which may exhibit extremely high volumetric expansion (e.g., 400%) during lithiation. Nonetheless, while various implementations are described with respect to batteries with silicon-based anodes, the disclosure is not limited to silicon-anode batteries.

In addition to addressing fabrication challenges, use of polymer electrolyte as a component in alkali-ion batteries (e.g., Li-ion batteries, with a Si-dominant anode) may also address some of the safety and performance issues associated with liquid electrolytes and/or some of the other solid-state electrolytes. For example, due to the composition of the polymer composite and the corresponding synergistic effect among different components, polymer-blend, composite-based all-solid-state electrolytes may possess acceptable Li-ion conductivity, good electrochemical stability within a wide voltage window, enhanced thermal stability and mechanical properties, and decreased flammability. Further, such solid-state electrolytes may enable battery operation at room temperature. Thus, use of such solid-state electrolytes may improve lifetime and safety of Li-ion (or in general alkali-ion) batteries.

In some implementations, solid-state electrolyte may be injected into the cell structure, in a similar manner that liquid electrolyte are injected. For example, the molten polymer can be simply injected into the cell in liquid (molten) form similar to the way liquid electrolyte is injected into most lithium-ion batteries today. The molten polymer electrolyte may wet standard porous electrodes as well as most common separators. The molten polymer cools and becomes a solid at room temperature.

Example implementations using solid-state electrolytes in accordance with the present disclosure, and performance thereof, are described in more detail below, particularly with respect to FIGS. 5-11.

Figure 2:
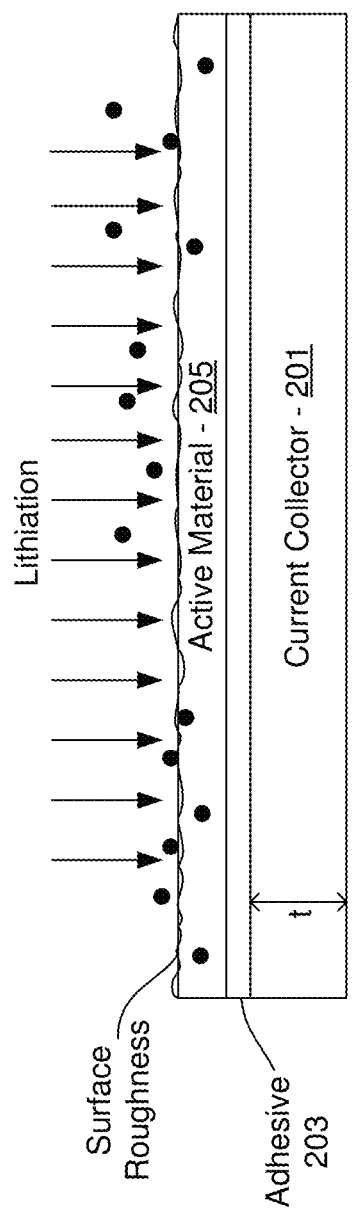
FIG. 2 illustrates an example silicon-dominant anode, in accordance with an example embodiment of the disclosure.

FIG. 2 illustrates an example silicon-dominant anode, in accordance with an example embodiment of the disclosure. Referring to FIG. 2, there are shown a current collector 201, an optional adhesive 203, and an active material 205. It should be noted, however, that the adhesive 203 may or may not be present depending on the type of anode fabrication process utilized, as the adhesive is not necessarily there in a direct coating process where the active material is formed directly on the current collector.

In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium particles impinging upon and lithiating the active material 205. As illustrated in FIG. 2, the current collector 201 has a thickness t, which may vary based on the particular implementation. In this regard, in some implementations thicker foils may be used while in other implementations thinner foils are used. Example thicker foils may be greater than 6 µm, such as 10 µm or 20 µm for copper, for example, while thinner foils may be less than 6 µm thick in copper.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing.

Figure 3:
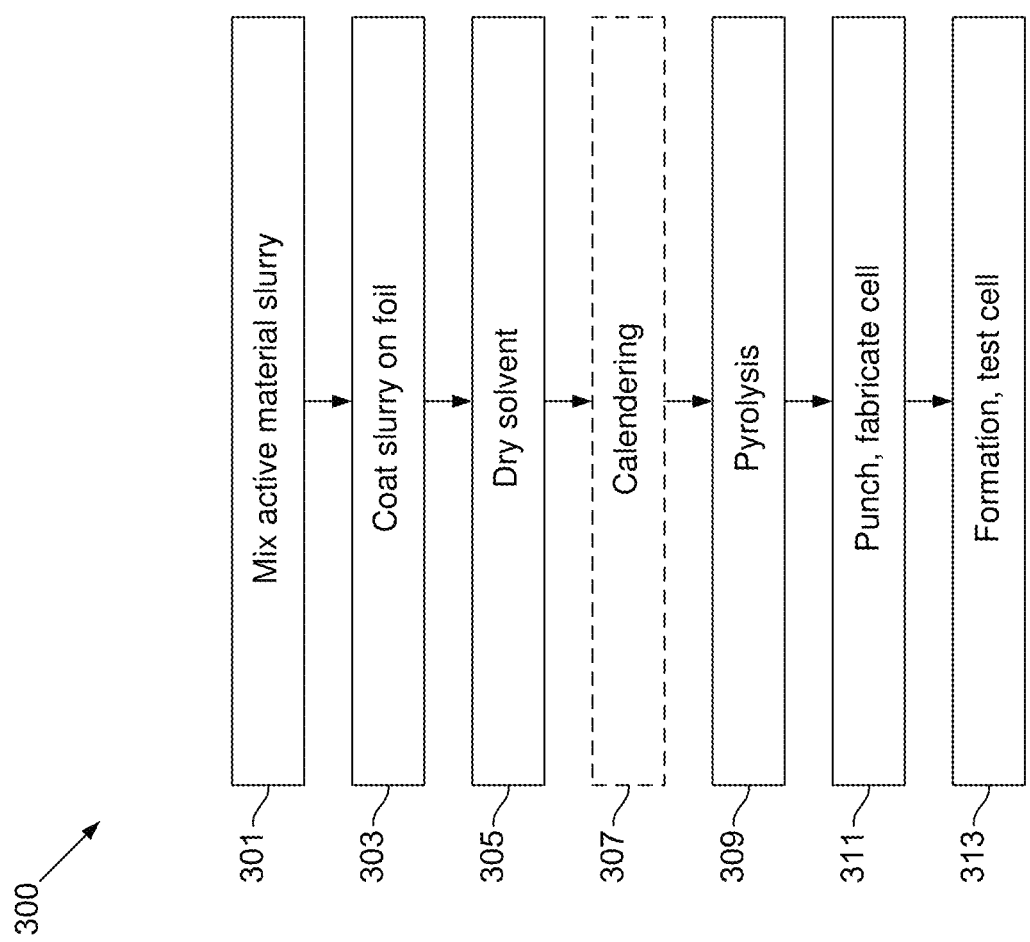
FIG. 3 is a flow diagram of a process for direct coating electrodes, in accordance with an example embodiment of the disclosure.

FIG. 3 is a flow diagram of a process for direct coating electrodes, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as PVDF, CMC, SBR, Sodium Alginate, PAI, Poly (acrylic acid) (FAA, PI, LA133, polyvinyl alcohol (PVA), polyethylene glycol (PEG), Nafion solution, recently reported electronically conductive polymer binders, and mixtures and combinations thereof. Another example process comprising forming the active material on a substrate and then transferring to the current collector is described with respect to FIG. 4.

In step 301, the raw electrode active material may be mixed using a binder/resin (such as PI, PAI), solvent, and conductive carbon, such as Super-P, graphene, VGCF, graphite, or other types of hard/soft carbon, etc., or a combination therefore. For example, graphene/VGCF (1:1 by weight) may be dispersed in NMP under sonication for, e.g., 1 hour followed by the addition of Super-P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 1000 rpm in a ball miller for a designated time, and then the conjugated carbon/NMP slurry may be added and dispersed at, e.g., 2000 rpm for, e.g., another predefined time to achieve a slurry viscosity within 2000-4000 cP and a total solid content of about 30%. The particle size and mixing times may be varied to configure the active material density and/or roughness.

In step 303, the slurry may be coated on the foil at a loading of, e.g., 3-4 mg/cm$^2$, which may undergo drying in step 305 resulting in less than 15% residual solvent content. In step 307, an optional calendering process may be utilized where a series of hard pressure rollers may be used to finish the film/substrate into a smoother and denser sheet of material.

In step 309, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 311. If done in roll form, the punching is done after the pyrolysis process. The punched electrode may then be sandwiched with a separator and cathode with electrolyte to form a cell.

In step 313, the cell may be subjected to a formation process, comprising initial charge and discharge steps to lithiate the anode, with some residual lithium remaining.

In various implementations in accordance with the present disclosure, solid-state electrolytes that are optimized for use in alkali-ion (e.g., lithium-ion) batteries and for enhancing performance of such batteries, may be used. As such, the direct coating based process as described in FIG. 3 may be adjusted to account for the use of such electrolyte. For example, heat treatment for the solid state composition may be added and/or incorporated into the process.

Figure 4:
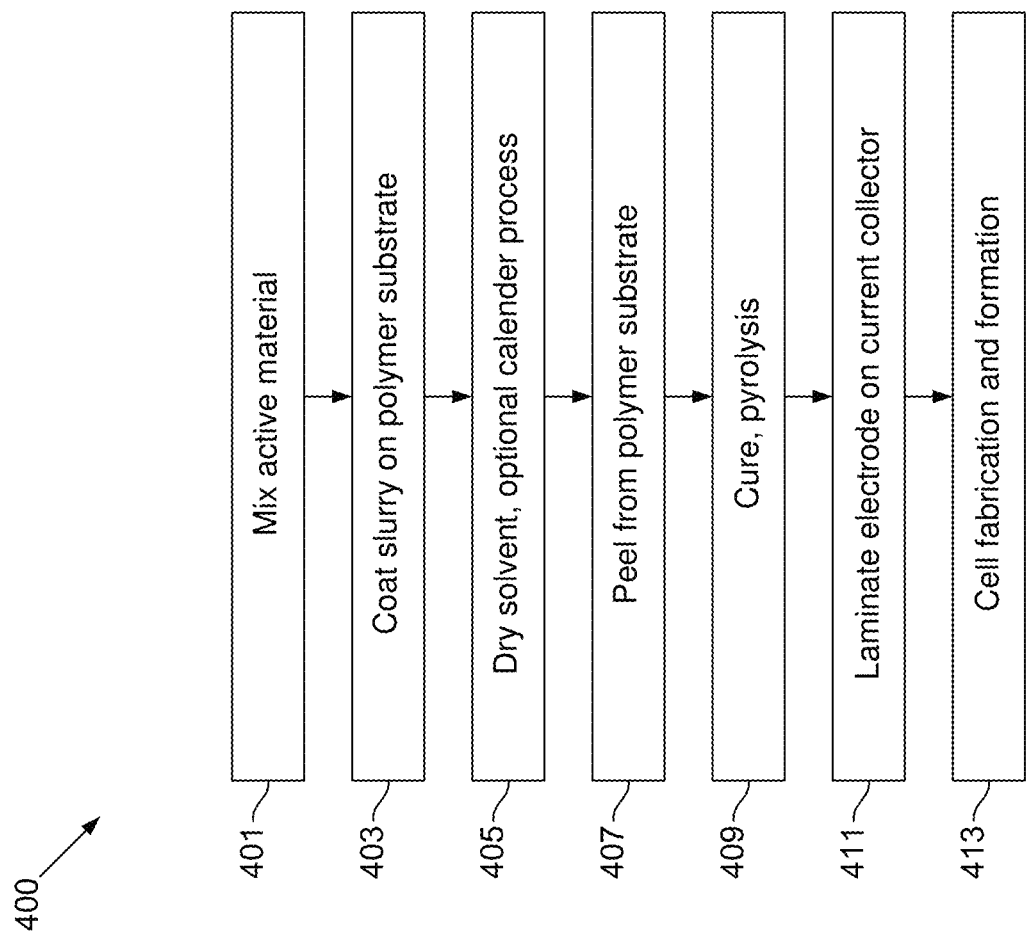
FIG. 4 is a flow diagram of an alternative process for transfer lamination of electrodes, in accordance with an example embodiment of the disclosure.

FIG. 4 is a flow diagram of an alternative process for transfer lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 4, starting with step 401 where the active material may be mixed with a binder/resin such as polyimide (PI) or polyamide-imide (PAI), solvent, other additives, and optionally a conductive carbon, such as Super-P, graphene, VGCF, graphite, or other types of hard/soft carbon, etc., or a combination therefore. As with the process described in FIG. 4, graphene/VGCF (1:1 by weight) may be dispersed in NMP under sonication for, e.g., 45-75 minutes followed by the addition of Super-P (1:1:1 with VGCF and graphene) and additional sonication for, e.g., 1 hour. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NM P slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 403, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 405. An optional calendering process may be utilized where a series of hard pressure rollers may be used to finish the film/substrate into a smoothed and denser sheet of material.

In step 407, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 409 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius.

In step 411, the pyrolyzed material may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 413, the electrode may then be sandwiched with a separator and cathode with electrolyte to form a cell. The cell may be subjected to a formation process, comprising initial charge and discharge steps to lithiate the anode, with some residual lithium remaining.

In various implementations in accordance with the present disclosure, solid-state electrolytes that are optimized for use in alkali-ion (e.g., lithium-ion) batteries and for enhancing performance of such batteries, may be used. As such, the transfer lamination based process as described in FIG. 4 may be adjusted to account for the use of such electrolyte. For example, heat treatment for the solid state composition may be added and/or incorporated into the process.

Figure 5:
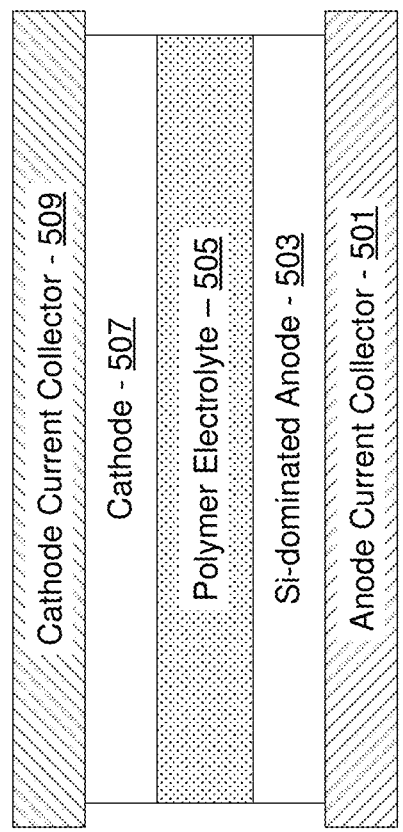
FIG. 5 illustrates an example solid-state electrolyte based cell structure, in accordance with an example embodiment of the disclosure.

FIG. 5 illustrates an example solid-state electrolyte based cell structure, in accordance with an example embodiment of the disclosure. Shown in FIG. 5 is a cell structure 500 that comprises a solid-state (polymer) electrolyte.

As shown in FIG. 5, the cell structure 500 comprises an anode current collector 501, an anode 503 a polymer electrolyte 505, a cathode 507, and a cathode current collector 509. The cell structure 500 (and components thereof) may be similar to the battery 100 (and similarly named components thereof), as described with respect to FIG. 1. In this regard, the anode current collector 501 may comprise a copper (Cu) based foil or sheet, the anode 503 may be a silicon-dominant anode, the cathode 507 may comprise a nickel based cathode (e.g., Nickel Cobalt Aluminum Oxide (NCA) based cathode), and the cathode current collector 509 may comprise an aluminum (Al) based foil or sheet. However, the cell structure 500 incorporates and is configured for use of polymer electrolyte rather than liquid electrolyte.

As noted above, substituting liquid electrolytes (or inorganic solid-state electrolytes) in lithium-ion batteries with all-solid-state polymer electrolytes may be advantageous as such polymer electrolytes may overcome many of the problems and issues that may be caused by the organic liquid electrolytes (such as leakage of organic solvents, flammability, etc.) and inorganic solid electrolytes (such as poor mechanical properties, low elastic moduli, high cost in materials, production, and processing, etc.). In this regard, in an ideal solvent-free polymer electrolyte, lithium salts are dissolved and solvated by the polymer chains.

The polymer electrolytes used may be selected based on pre-defined performance criteria. For example, general requirements for solid-state polymer electrolytes may be: (i) high ionic conductivity, (ii) sufficient thermal and electrochemical stabilities, and (iii) excellent mechanical properties and dimensional stability. However, sufficiently high lithium conductivity at room temperature is difficult with solvent-free polymer electrolytes, due to the crystallization of the polymer at room temperature, which heavily hampers the Li-ion transport.

In some instances, quasi-solid-state polymer or polymer gel electrolytes (fabricated, e.g., by soaking a certain amount of liquid electrolyte into polymer solid membranes), may be utilized. For example, polyethylene oxide (PEO) may be particularly suitable for use in solid-state polymer electrolytes, e.g., due to its capacity to dissolve Li salts and high ionic conductivity at high temperature. However, PEO's lower mechanical strength, especially at elevated temperatures may limit cell performance.

An effective strategy to achieve a balance of advantageous properties including ionic conductivity, mechanical strength, thermo-stability, and electrochemical window for high-performance in a solid-state electrolyte is to utilize blend polymers—that is, where a mixture of polymers is used, with the constituent components and ratios thereof are set adaptively to optimize performance. In this regard, compared with other methods, directly blending different types of polymers is convenient, efficient, low cost, and easy to achieve. In addition, the crystallinity of PEO may be reduced, e.g., by the hydrogen bonds between the blended polymers, which may improve the ionic conductivity of solid electrolyte. Blended polymers could also reinforce the PEO phase, further improving the mechanical strength and dimensional thermo-stability. As a result, blending may be an effective method to improve the ionic conductivities and mechanical strength of PEO-based membrane.

Use of solid-state electrolytes in combination with lithium metal electrodes may be particularly advantageous, as the solid-state electrolytes may help prevent or perhaps eliminate the lithium dendrite growth issues that may occur in cells using metallic lithium foil as an electrode. While oxides and sulfides are commonly thought to be better at preventing lithium dendrite growth compared to polymer electrolytes and other solid-electrolytes, other high energy density electrodes such as silicon, germanium or other alloys may be used in solid-state electrolyte-containing cells. For example, in cases where lithium plating is not a worry, it is beneficial to use polymer electrolytes instead due to cost and manufacturing advantages.

In various example implementations, quaternary solid-state polymer electrolytes may be used. In this regard, an example quaternary solid-state polymer electrolyte may be fabricated using a mixture of polyethylene glycol (PEG), which is a polyether compound, PEO (which is a long chain, higher molecular weight form of PEG), salt, such as lithium salt (e.g., Lithium bis(trifluoromethanesulfonyl)imide (LiTFSl), which is hydrophilic salt with the chemical formula $LiC_2F_6NO_4S_2$), a thermal initiator, particularly a thermal initiator soluble in common organic solvents (e.g., Azobisisobutyronitrile (AIBN)) that provides covalent bonding between polymers (PEG and PEO), and a solvent, particularly a polar aprotic solvent with high chemical and thermal stability, such as glymes (e.g., Tetraethylene glycol dimethyl ether (TEGDME)). Thermal treatment of such quaternary compositions results in formation of an all-solid-state polymer, which is flexible and possesses mechanical stability.

For example, with reference to the cell structure 500 shown in FIG. 5, the polymer electrolyte 505 may comprise and/or be formed based on such a quaternary solid-state polymer composition, which may then become solid-state electrolyte (e.g., functioning as separator) within the cell after heat treatment. In this regard, prior to solidification, the polymer electrolyte may be in liquid form (e.g., at temperatures >70° C.). The liquid polymer solution is then used in fabricating the Si-anode based cell illustrated in FIG. 5.

In various implementations, the proportions of the various components in the solid-state quaternary compositions may be adaptively selected and/or varied, such as based on testing and experimentation, to achieve optimal performance. In this regard, various performance (including safety) criteria may be considered, and as such different compositions may be used for different cells and/or different use scenarios.

Figure 6:
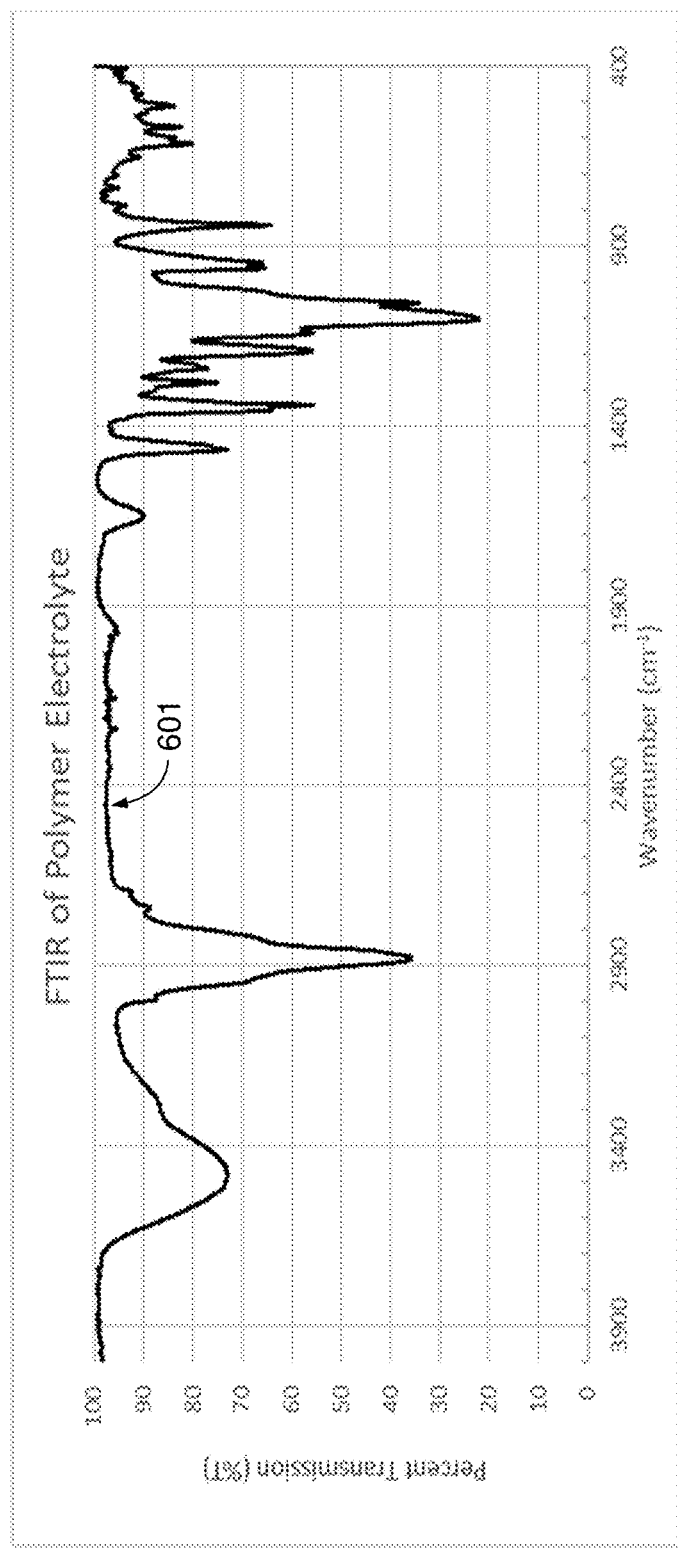
FIG. 6 is a plot illustrating attenuated total reflectance (ATR)/Fourier transform infrared spectroscopy (FTIR) spectrum of an example solid-state electrolyte, in accordance with an example embodiment of the disclosure.

FIG. 6 is a plot illustrating attenuated total reflectance (ATR)/Fourier transform infrared spectroscopy (FTIR) spectrum of an example solid-state electrolyte, in accordance with an example embodiment of the disclosure. Shown in FIG. 6 is a plot 601 illustrating result of attenuated total reflectance (ATR)-Fourier transform infrared spectroscopy (FTIR) spectrum analysis of an example polymer in accordance with the present disclosure (e.g., polymer with a PEG:PEO:LiTFSl:TEGDME:AlBN composition). The transmission spectra may be utilized to determine material characteristics of the polymer. For example, the location of transmission peaks and valleys may indicate particular compositions.

Figure 7:
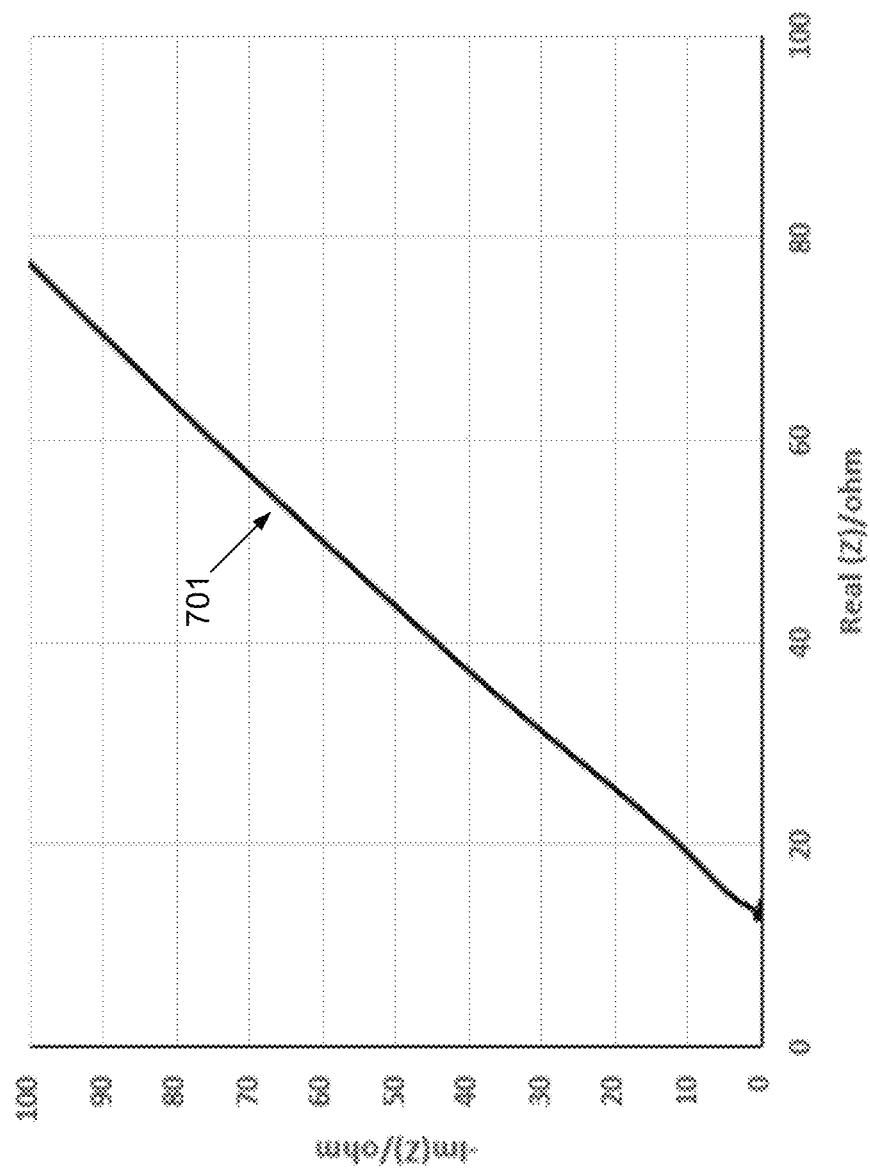
FIG. 7 is a plot illustrating Nyquist plot of an example solid-state electrolyte based cell, in accordance with an example embodiment of the disclosure.

FIG. 7 is a plot illustrating Nyquist plot of an example solid-state electrolyte based cell, in accordance with an example embodiment of the disclosure. Shown in FIG. 7 is a plot 701 demonstrating the results of an impedance analysis of a solid-state cell implemented in accordance with the present disclosure—e.g., a cell comprising a solid state electrolyte, such as a cell similar to the cell 500 of FIG. 5, comprising a Si-dominant anode, NCA cathode, common separator (e.g., Celgard separator), and a solid-state electrolyte (e.g., using a PEG:PEO:LiTFSl:TEGDME:AlBN composition).

For example, the impedance analysis may be based on performing Electrochemical Impedance Spectroscopy (EIS) on the cell, to study the impedance at room temperature. The plot of FIG. 7 demonstrates the result of the impedance analysis in a Nyquist plot. The plot shows that the cell has favorable impedance performance, with a low resistance—that is, showing that lithium ions migrate fast throughout the anode, separator and the cathode.

Figure 8:
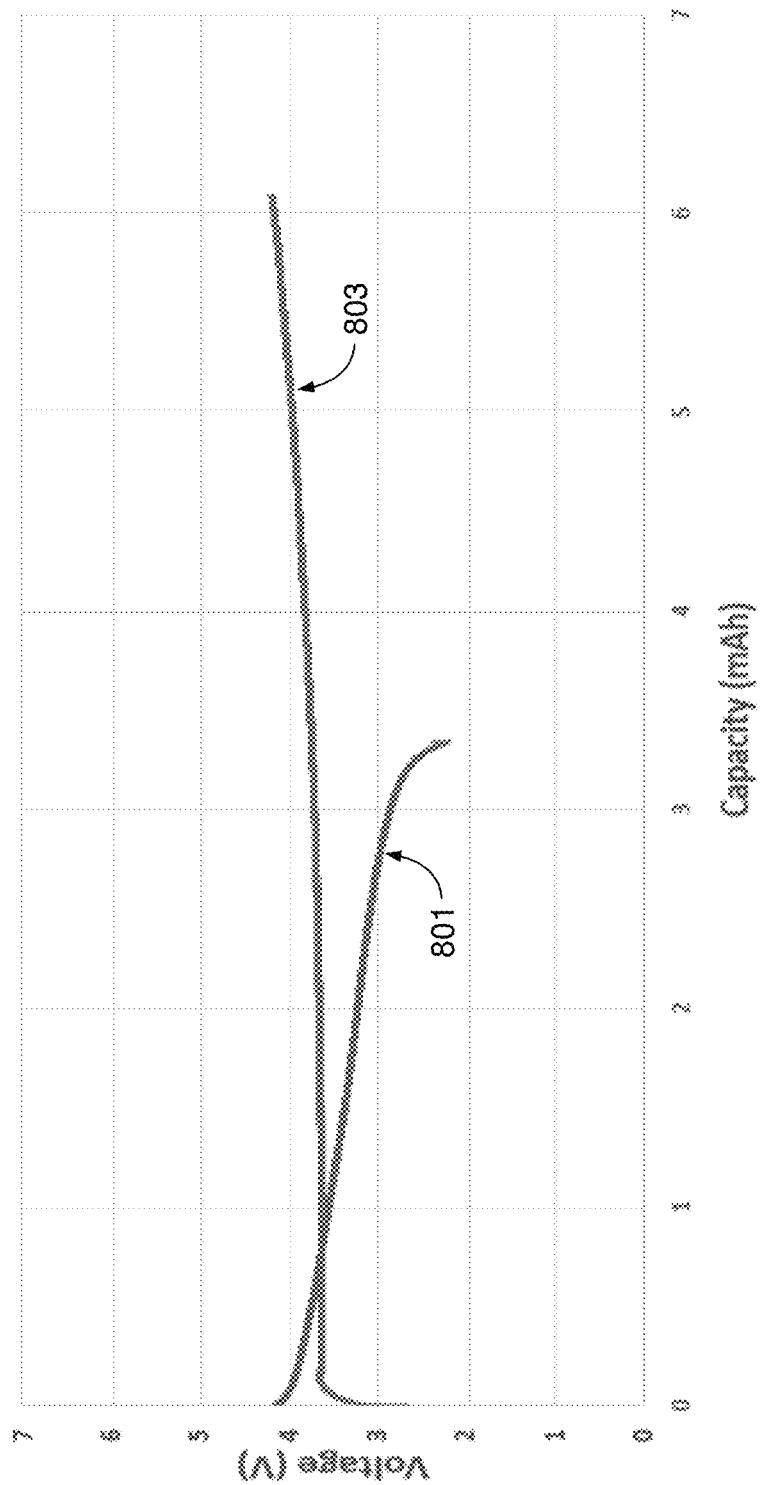
FIG. 8 is a plot illustrating a voltage profile of an example solid-state electrolyte based cell, in accordance with an example embodiment of the disclosure.

FIG. 8 is a plot illustrating a voltage profile of an example solid-state electrolyte based cell, in accordance with an example embodiment of the disclosure. Shown in FIG. 8 are plots 801 and 803 illustrating the first cycle voltage profile of a solid-state cell implemented in accordance with the present disclosure—e.g., a cell comprising a solid state electrolyte, such as a cell similar to the cell 500 of FIG. 5, comprising a Si-dominant anode, NCA cathode, common separator (e.g., Celgard separator), and a solid-state electrolyte (e.g., using a PEG:PEO:LiTFSl:TEGDME:AlBN composition). The cell may be cycled, such as at 20° C., between 4.2V and 2.2V versus $Li^+/Li^0$ at C-rate of C/50. The expected cell capacity (803) is approximately 6.0 mAh. As illustrated in FIG. 8, the use of the solid-sate electrolytes allows the silicon anode cell to perform at room temperature with first cycle coulombic efficiency of >50% (801).

Figure 9:
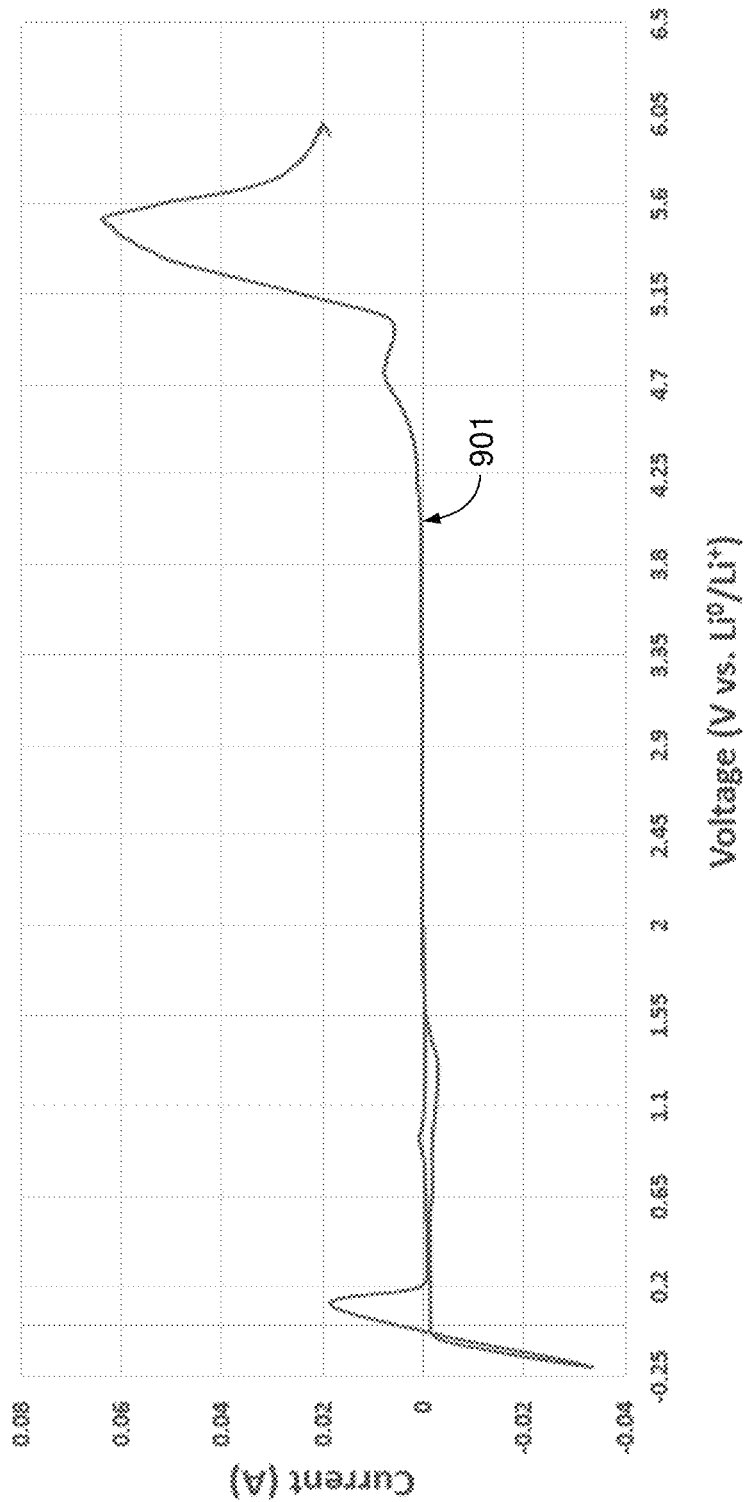
FIG. 9 is a plot illustrating cyclic voltammetry response of an example solid-state electrolyte, in accordance with an example embodiment of the disclosure.
Figure 10:
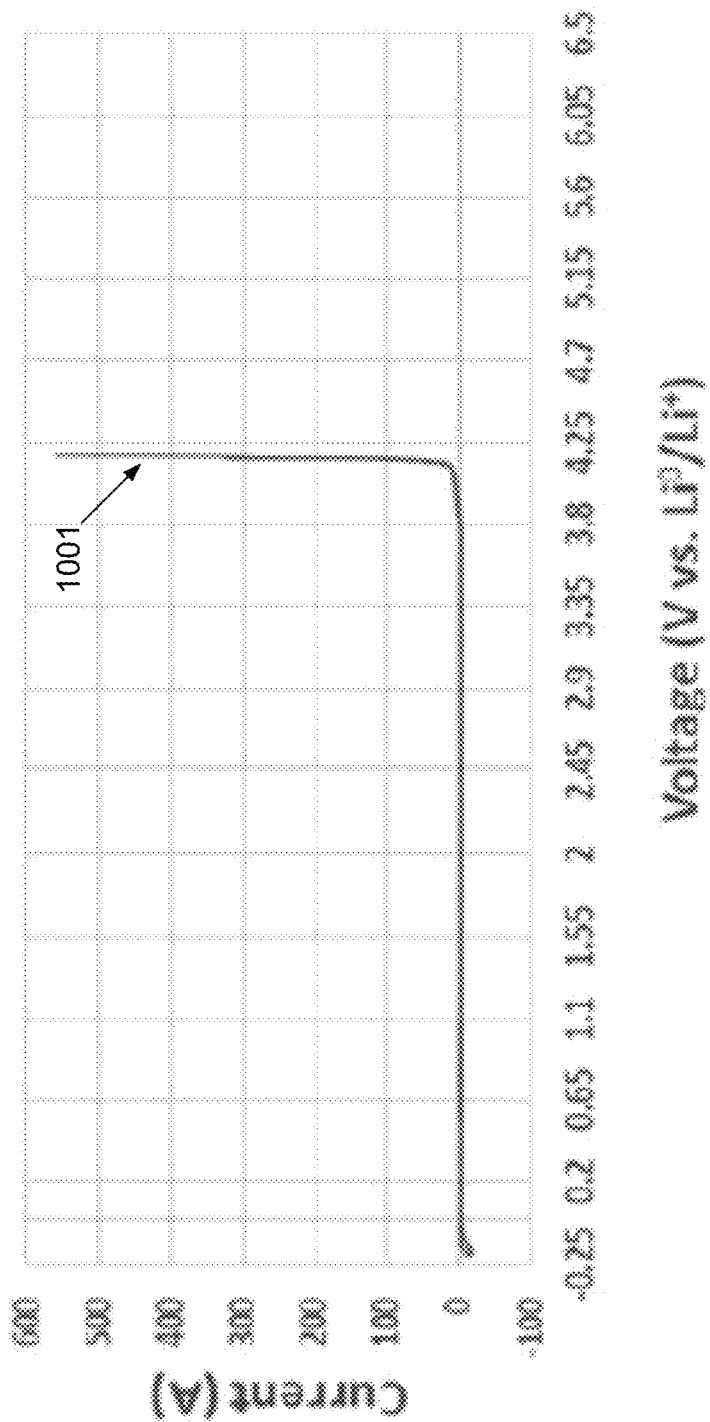
FIG. 10 is a plot illustrating cyclic voltammetry response of another example solid-state electrolyte, in accordance with an example embodiment of the disclosure.
Figure 11:
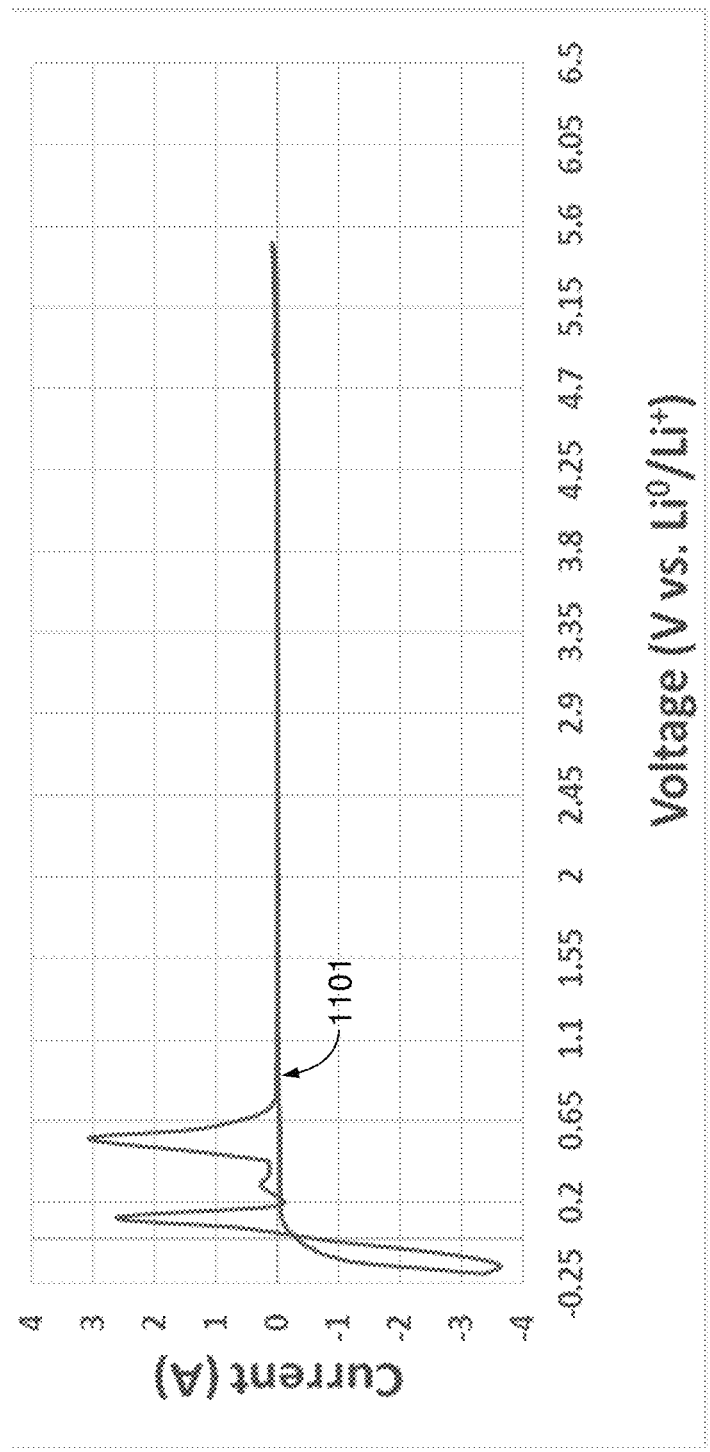
FIG. 11 is a plot illustrating cyclic voltammetry response of another example solid-state electrolyte, in accordance with an example embodiment of the disclosure.

FIGS. 9-11 show the cyclic voltammetry response of three different solid-state electrolytes, each with different composition, demonstrating how the composition of the solid-state electrolyte may influence the electrochemical voltage window stability of the cell.

FIG. 9 is a plot 901 illustrating cyclic voltammetry response of an example solid-state electrolyte, in accordance with an example embodiment of the disclosure. Shown in FIG. 9 is a plot illustrating cyclic voltammetry response (current vs. voltage) for an example cell comprising a solid-state electrolyte formed using composition of PEG:PEO:LiTFSl:TEGDME:AlBN at ratios of 10.3:25.77:20.62:36.1:7.21—that is, with PEG at 10.3%, PEO at 25.77%, LiTFSl at 20.62%; TEGDME at 36.1% and AlBN at 7.21%.

FIG. 10 is a plot illustrating cyclic voltammetry response of another example solid-state electrolyte, in accordance with an example embodiment of the disclosure. Shown in FIG. 10 is a plot 1001 illustrating cyclic voltammetry response (current vs. voltage) for an example cell comprising a solid-state electrolyte formed using composition of PEG:PEO:LiTFSl:TEGDME:AlBN at ratios of 10.53:26.32:21.05:36.84:5.26—that is, with PEG at 10.53%, PEO at 26.32%, LiTFSl at 21.05%; TEGDME at 36.84% and AlBN at 5.26%.

FIG. 11 is a plot illustrating cyclic voltammetry response of another example solid-state electrolyte, in accordance with an example embodiment of the disclosure Shown in FIG. 11 is a plot 1101 illustrating cyclic voltammetry response (current vs. voltage) for an example cell comprising a solid-state electrolyte formed using composition of PEG:PEO:LiTFSl:TEGDME:AlBN at ratios of 10.2:25.52:20.40:35.71:8.17—that is, with PEG at 10.2%, PEO at 25.52%, LiTFSl at 20.40%; TEGDME at 35.71% and AlBN at 8.17%.

Thus, in all three samples undergoing cyclic voltammetry test, as illustrated in FIGS. 9-11, the ratio of PEG:PEO:LiTFSl:TEGDME in the composition (that is, relative ratios of these components to each other) is kept the same with only the amount of AlBN varied. The variations in the cyclic voltammetry responses as shown in these figures illustrate that AlBN may have a critical role in the electrochemical stability of the solid-state polymer electrolytes, as increasing the proportion of AlBN in the composition increases the voltage at which oxidation occurs.

Accordingly, the use of polymer-blend-based, composite all-solid-state electrolytes in accordance with the present disclosure, particularly in alkali-ion batteries (e.g., Li-ion batteries, such as with Si-dominant anodes) provide various advantages. For example, these all-solid-state electrolytes (and thus batteries using them) may be less susceptible to combustion, leaking, or corrosion when compared with pure organic liquid electrolytes (and thus batteries using them). Additionally, the high fracture energy and elastic moduli, and excellent compatibility with electrodes of these all-solid-state electrolytes may be superior to pure inorganic electrolytes. Further, the polymer-blend-based composite all solid-state electrolytes may be more chemically and mechanically stable with electrodes, such as Si or graphite anodes and high-voltage Ni-rich (e.g., NCM or NCA) cathodes, and provide the function or role of separators in the cell.

Other adventurous functional properties may include high thermal stability during charge and discharge, a wide electrochemical stability window against irreversible reaction, good compatibility with the electrodes, enhanced Li transference number, and high total $Li^+$ ionic conductivity. This may help address various safety issues that may arise with the use of other electrolytes, and may also provide several other significant advantages, such as higher energy storage ability, easy fabrication, and low cost. Another advantage of using polymer-blend-based, composite all-solid-state electrolytes in accordance with the present disclosure is the ability to inject the electrolytes as a liquid, which allow for continuing use of existing equipment, existing designs, and the existing fabrication facilities, thus allowing for cost savings and fast adoption.

With respect to use in lithium-ion batteries, quaternary solid-state polymer electrolytes in accordance with the present disclosure may offer such benefits as, increased safety (due to absence of flammable liquid), increased energy density (can be made possible by using a thin electrolyte/separator layer), increased thermal stability, minimal electrolyte degradation and consumption, lowered impedance (compared with typical solid electrolytes), decreased gassing, high electrochemical stability in a wide voltage window, good mechanical strength and stability to accommodate electrode expansion and contraction, ease of thin film fabrication with desirable shapes and the ability of forming good electrode/electrolyte contact, cheap fabrication and reuse of existing capital equipment, etc.

An example solid-state polymer electrolyte in accordance with the present disclosure may comprise a first polyether compound with a corresponding melting point (e.g., <100° C.) and a corresponding molecular weight (e.g., <10,000 MW); a second polyether compound with corresponding melting point (<100° C.) that is higher than the melting point of the first polyether compound, and a corresponding molecular (e.g., >100,000 MW); at least one lithium salt comprising a lithium cation and a basic anion, at least one glycol ether; and at least one thermal initiator. The solid-state polymer electrolyte may comprise a high modulus oxide for reinforcing the solid-state polymer electrolyte. The high modulus oxide may comprise one or more of $Al_2O_3$, $Sb_2O_3$, $GeO_2$, $SiO_2$, etc. The solid-state polymer electrolyte may comprise a glass microfiber and/or an electrically insulating frame for reinforcing the solid-state polymer electrolyte.

The thermal initiator may comprise Azobisisobutyronitrile (AIBN). The thermal initiator concentration may be >5% by weight; alternatively, the thermal initiator concentration may be >7% by weight; alternatively, the thermal initiator concentration may be >8% by weight. The first polyether compound may comprise polyethylene glycol (PEG). The second polyether compound may comprise polyethylene oxide (PEO). The lithium salt may comprise one or more of lithium bis(trifluoromethanesulfonyl)imide (LiTFSl), lithium bis(fluorosulfonyl) imide (LiFSl), and lithium hexafluorophosphate ($LiPF_6$), and/or mixtures and combinations thereof. In some implementations, the solid-state polymer electrolyte may comprise two or more different lithium salts for use as lithium sources (e.g., in the polymer electrolyte separator). The glycol ether may comprise one or more of monoglyme, diglyme, triglyme, tetraglyme and mixtures and combinations thereof. The glycol ether may comprise Tetraethylene glycol dimethyl ether (TEGDME). The amount of the first polyether compound may be less than 15% of the solid-state polymer electrolyte. The amount of the second polyether compound may be between 10-35% of the solid-state polymer electrolyte. The amount of the lithium salt may be less than 25% of the solid-state polymer electrolyte. The amount of the glycol ether may be less than 40% of the solid-state polymer electrolyte. The amount of the thermal initiator may be less than 10% of the solid-state polymer electrolyte.

An example electrochemical cell in accordance with the present disclosure may comprise a non-metallic or metallic anode as the negative electrode, a cathode as the positive electrode, and a solid-state polymer electrolyte (e.g., as described above). The solid-state polymer electrolyte may be embedded and added to the positive electrode. The solid-state polymer electrolyte may be embedded and added to the negative electrode. The solid-state polymer electrolyte may be added to the cell in molten form. The anode may comprise a silicon-dominant (e.g., >50%) anode. In some implementations, the substantially liquid (e.g., molten) electrolyte may be kept in substantially solid or gel form during normal operating temperatures (e.g. 0-35° C., 0-45° C., 0-55° C., or 0-60° C.) of the electrochemical cell. In some implementations, the electrochemical cell may be initially configured just like a normal electrochemical cell—that is, with a liquid electrolyte including a standard separator—and the solid-state polymer electrolyte may then be added in the molten form and then solidifies. The electrochemical cell may incorporate a design where lithium plating is not normally a concern—e.g., graphite vs metal oxide, silicon vs metal oxide, silicon-graphite composites vs metal oxide.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein, an apparatus is "configurable" to perform a function whenever the apparatus comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A solid-state polymer electrolyte comprising:
   a first polyether compound with a corresponding first melting temperature;
   a second polyether compound with a corresponding second melting temperature, wherein the second melting temperature is higher than the first melting temperature, and wherein both the first melting temperature and the second melting temperature are less than 100° C.;
   a lithium salt mixture comprising two or more different lithium salts for use as lithium sources, with each lithium salt comprising a lithium cation and a basic anion;
   a glycol ether; and
   a thermal initiator,
   wherein an amount of the thermal initiator in the solid-state polymer electrolyte is based on one or more performance criteria, and wherein the one or more performance criteria comprise voltage at which oxidation occurs; and
   wherein the thermal initiator has a concentration of >5% by weight of the solid-state polymer electrolyte.

2. The solid-state polymer electrolyte of claim 1, further comprising a high modulus oxide for reinforcing the solid-state polymer electrolyte.

3. The solid-state polymer electrolyte of claim 2, wherein the high modulus oxide comprise one or more of $Al_2O_3$, $Sb_2O_3$, $GeO_2$, and $SiO_2$.

4. The solid-state polymer electrolyte of claim 1, further comprising a glass microfiber and/or an electrically insulating frame for reinforcing the solid-state polymer electrolyte.

5. The solid-state polymer electrolyte of claim 1, wherein the lithium salt mixture comprises one or more of lithium bis(trifluoromethanesulfonyl) imide (LiTFSI), lithium bis(fluorosulfonyl) imide (LiFSI), and lithium hexafluorophosphate (LiPF6).

6. The solid-state polymer electrolyte of claim 1, wherein the glycol ether comprises one or more of monoglyme, diglyme, triglyme, tetraglyme.

7. The solid-state polymer electrolyte of claim 1, wherein the glycol ether comprises Tetraethylene glycol dimethyl ether (TEGDME).

8. The solid-state polymer electrolyte of claim 1, wherein the thermal initiator comprises Azobisisobutyronitrile (AIBN).

9. The solid-state polymer electrolyte of claim 1, wherein the thermal initiator has a concentration of >7% by weight of the solid-state polymer electrolyte.

10. The solid-state polymer electrolyte of claim 1, wherein the thermal initiator has a concentration of >8% by weight of the solid-state polymer electrolyte.

11. The solid-state polymer electrolyte of claim 1, wherein an amount of the first polyether compound is less than 15% by weight of the solid-state polymer electrolyte.

12. The solid-state polymer electrolyte of claim 1, wherein an amount of the second polyether compound is between 10-35% by weight of the solid-state polymer electrolyte.

13. The solid-state polymer electrolyte of claim 1, wherein an amount of the lithium salt mixture is less than 25% by weight of the solid-state polymer electrolyte.

14. The solid-state polymer electrolyte of claim 1, wherein an amount of the glycol ether may be less than 40% by weight of the solid-state polymer electrolyte.

15. The solid-state polymer electrolyte of claim 1, wherein an amount of the thermal initiator may be less than 10% by weight of the solid-state polymer electrolyte.

16. An electrochemical cell comprising:
    a solid-state polymer electrolyte;
    a non-metallic or metallic anode configured as a negative electrode; and
    a cathode configured as a positive electrode:
    wherein the solid-state polymer electrolyte comprises:
       a first polyether compound with a corresponding first melting temperature;
       a second polyether compound with a corresponding second melting temperature, wherein the second melting temperature is higher than the first melting temperature, and wherein both the first melting temperature and the second melting temperature are less than 100° C.;
       two or more different lithium salts as lithium sources, each lithium salt comprising a lithium cation and a basic anion; and
       a glycol ether; and
       a thermal initiator,
       wherein an amount of the thermal initiator in the solid-state polymer electrolyte is based on one or more performance criteria, and wherein the one or more performance criteria comprise voltage at which oxidation occurs; and
       wherein the thermal initiator has a concentration of >5% by weight of the solid-state polymer electrolyte.

17. The electrochemical cell of claim 16, wherein the solid-state polymer electrolyte is embedded and added to the positive electrode.

18. The electrochemical cell of claim 16, wherein the solid-state polymer electrolyte is embedded and added to the negative electrode.

19. The electrochemical cell of claim 16, wherein the solid-state polymer electrolyte is configured to be added to the electrochemical cell in a molten form.

20. The electrochemical cell of claim 19, wherein the solid-state polymer electrolyte is configured to be, after being added to the electrochemical cell in the molten form, in substantially solid or gel form during normal operating temperatures of the electrochemical cell.

21. The electrochemical cell of claim 19, wherein the electrochemical cell initially comprises a separator and a liquid electrolyte, and wherein the solid-state polymer electrolyte is then added in the molten form and then solidified.

22. The electrochemical cell of claim 16, wherein the anode comprises a silicon-dominant anode.

23. The solid-state polymer electrolyte of claim 1, wherein the first polyether compound has a molecular weight less than 10,000 MW, and wherein the second polyether compound has a molecular weight greater than 100,000 MW.

24. The electrochemical cell of claim 16, wherein the first polyether compound has a molecular weight less than 10,000 MW, and wherein the second polyether compound has a molecular weight greater than 100,000 MW.

25. The solid-state polymer electrolyte of claim 1, wherein the first polyether compound comprises polyethylene glycol (PEG), and wherein the second polyether compound comprises polyethylene oxide (PEO).

26. The electrochemical cell of claim 16, wherein the first polyether compound comprises polyethylene glycol (PEG), and wherein the second polyether compound comprises polyethylene oxide (PEO).

* * * * *